CONTENT ADDRESSABLE MEMORY

Filed Dec. 10, 1963 4 Sheets-Sheet 1

INVENTOR.
RALPH J. KOERNER
BY Arthur Freilich
ATTORNEY

RALPH J. KOERNER
INVENTOR.

BY Arthur Freilich

ATTORNEY

INVENTOR.
RALPH J. KOERNER
BY Arthur Friedrich
ATTORNEY

Dec. 13, 1966 R. J. KOERNER 3,292,159

CONTENT ADDRESSABLE MEMORY

Filed Dec. 10, 1963 4 Sheets-Sheet 1

INVENTOR.
RALPH J. KOERNER
BY Arthur Frederick
ATTORNEY

United States Patent Office 3,292,159
Patented Dec. 13, 1966

3,292,159

CONTENT ADDRESSABLE MEMORY

Ralph J. Koerner, Canoga Park, Los Angeles, Calif., assignor, by mesne assignments, to The Bunker-Ramo Corporation, Stamford, Conn., a corporation of Delaware Filed Dec. 10, 1963, Ser. No. 329,405
21 Claims. (Cl. 340—172.5)

This invention relates generally to digital memories and more particularly to improvements in content addressable type memories, such memories being characterized by having the ability to permit all words stored in the memory to be searched in parallel, i.e., simultaneously.

U.S. Patent 3,031,650 discloses some basic content addressable memory implementations and discusses the characteristics which distinguish such memories from conventional digital memories. Briefly, the significant distinguishing characteristic is that each memory location in a content addressable memory is not uniquely identified by an address as in conventional digital memories but instead content addressable memory locations are selected on the basis of information stored therein; i.e. the contents thereof. Hence, the name content addressable memory.

As a result of selecting locations on the basis of stored information, memory search times can be considerably reduced at the cost of some additional hardware. That is, in situations where it is desired to select those locations, out of N locations in memory, storing information (words) identical to a search word, information identifying those locations can be derived in one memory access period instead of the N such periods required by conventional digital memories. More particularly, whereas it is necessary in a conventional digital memory to sequentially access the contents of each location (a word) and compare each such word for identity with a search word, comparison of the search word with all the stored words can be simultaneously effected in a content addressable memory.

Essentially, a content addressable memory operates by causing a signal representative of a search word bit to be applied simultaneously to all memory location elements storing bits of corresponding significance. Some type of logic means is provided in the memory, such means being operable to generate signals to indicate whether the bits stored in the various memory location elements are the same as or different from the corresponding search bit being sought. All elements of a single memory location are coupled to a common word sense line and by sensing resultant signals appearing on the word sense line, a determination is made as to whether or not the word stored in the memory location associated with the word sense line matches or mismatches the search word.

Whereas the content addressable memory embodiment disclosed in the aforementioned U.S. Patent No. 3,031,650 utilizes means (e.g. a flip-flop or a pair of non-destructive readout magnetic cores) capable of providing both true and complementary manifestations for each stored information bit so as to permit all stored bits to be considered in parallel, as well as all stored words being considered in parallel, U.S. patent application Serial No. 269,009, filed March 29, 1963 by Ralph J. Koerner and Alfred D. Scarbrough and assigned to the same assignee as the present application, discloses a content addressable memory requiring only a single element (e.g. a non-destructive readout magnetic core) for each stored bit by causing the bits of the stored words to be considered serially or sequentially, while the words are still considered in a parallel fashion. In addition to the hardware reduction derived from a sequential, rather than a parallel consideration of the bits, several other advantages which are discussed in the above-cited patent application and will only briefly be mentioned here are introduced. An initial advantage is that considerably higher signal-to-noise ratios are available on the word sense lines if only one element coupled thereto is operated on at a time. The provision of higher signal-to-noise ratios of course means that less critically designed and less expensive sense amplifiers can be employed. A second and very significant advantage is that by considering bits sequentially, very many useful searches, other than equality, can be performed; e.g. "greater than" and "less than" magnitude comparison searches can be easily performed as disclosed in the above-cited application.

Although not essential to a clear understanding of the present invention, it is pertinent to observe that in one form of the invention set forth in the above-cited patent application, bit equality decisions are made at each memory element. That is, all memory elements storing bits having the same degree of significance are simultaneously compared with a corresponding bit of the search word and an equality decision is made at each such memory element such that the memory element provides a mismatch signal on a word sense line associated therewith whenever it stores a bit which mismatches the corresponding search bit. The sets of memory elements storing bits having different degrees of significance are considered sequentially. All memory elements forming part of a common location, i.e., storing bits common to a single word are associated with the same word sense line and as a consequence, by sensing whether or not a mismatch signal appears on a particular word sense line, a conclusion can be drawn as to whether the stored word associated therewith matches the search word.

The content addressable memory and the cited application may be implemented by utilizing magnetic memory elements to which are coupled binary interrogation signals such that a first interrogation signal will cause a memory element to provide opposite polarity output pulses to respectively indicate its two possible states and a second interrogation signal will cause the memory element to provide output pulses opposite to those provided in response to the first interrogation signal. Although each memory element therefore provides either a match or mismatch signal depending upon whether the binary state represented by the interrogation signal is different from or the same as the bit stored by the element, preferably only mismatch signals appearing on the word sense lines are sensed. The binary interrogation signals are respectively manifested by increasing and decreasing currents on a digit interrogate line in accordance with corresponding search word bits stored in a search word register. Each digit interrogate line is associated with magnetic memory elements storing bits of the same significance.

In contrast to the teachings of the cited application, the preferred embodiment of the present invention does not utilize the bits of a search word stored in a register to determine which binary interrogation signal to apply to each digit interrogate line. Instead, the present invention teaches that the search word can be effectively stored in the memory so that a binary output signal representing the state of a search bit and a plurality of binary output signals, each representing the state of a bit stored in a different word, are provided in response to the generation of an interrogation signal. By subsequently determining the difference between the binary output signal representing the search bit and each of the other developed binary output signals, a match or mismatch conclusion can be drawn. The difference between the binary output signal representing the search bit and each binary output signal representing a matching stored bit will be substantially zero while it will be substantially twice the magnitude of the binary output signal representing a mismatching stored bit.

Briefly therefore, the present invention is based on the recognition that in a content addressable memory, a mismatch condition between a search bit and a stored bit can be recognized by interrogating the respective elements storing the bits to develop binary output signals and by thereafter determining the correspondence between, as by adding in opposition, the respective binary output signals to see whether they are the same or different.

In an initial embodiment of the invention, a different differential sense amplifier is connected to each of the memory word sense lines with the word sense line associated with the memory location storing the search word being common to the input of all of the differential sense amplifiers.

In a second embodiment of the invention, in lieu of using differential sense amplifiers, the search word memory location word sense line is connected in opposition to each of the other memory location word sense lines so that cancellation of memory element output signals will occur only in match situations thereby easily permitting a conventional sense amplifier to detect a mismatch situation. The search word memory location word sense line can be connected in opposition to the other word sense lines by merely connecting a first terminal thereof to a reference potential and a second terminal thereof to the terminals on the other word sense lines remote from the sense amplifiers. By providing suitable switch means, any selected one of the memory word sense lines can be selectively connected in opposition to all of the other word sense lines so that any word stored in the memory can be utilized as the search word without requiring that words be transferred between locations in the memory.

In a still further embodiment of the invention, a pair of memory locations is used to store first and second words which respectively are comprised af all "1" bits and all "0" bits. The word sense lines respectively associated with these locations are connected in opposition to the other memory location word sense lines by a single-pole double-throw switch means operated in accordance with the states of successive search word bits which can, e.g. be stored in a data register.

An extremely significant feature common to each of the embodiments herein disclosed is the means employed for successively energizing the digit interrogate lines. Each digit interrogate line is associated with a set of memory elements storing bits of corresponding significance, each such set of memory elements corresponding to a different degree of significance. Whereas in the above-cited patent application, a counter is disclosed which provides timing signals which define discrete periods, a different digit interrogate line being energized during each such period, the feature taught herein is to interconnect the various digit interrogate lines by delay means so that an interrogation current in each line is initiated a finite time period after the interrogation current is initiated in a preceding line. The finite time period is sufficiently great to permit the interrogation current in a preceding line to be propagated to the closest memory element associated therewith to cause it to provide a binary output signal on its word sense line so that the sense amplifier connected thereto can distinguish between successive signals appearing thereon. It is pointed out that this feature, which can be employed with equal success in the embodiments of the cited application, reduces the time required to perform sequential searches, as compared with the technique suggested in that application.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 2(*b*) is a waveform chart illustrating the operation of the memory element of FIGURE 2(*a*);

FIGURE 3(*b*) is a waveform chart showing various signals developed in the embodiment of FIGURE 3(*a*)

Figure 1:
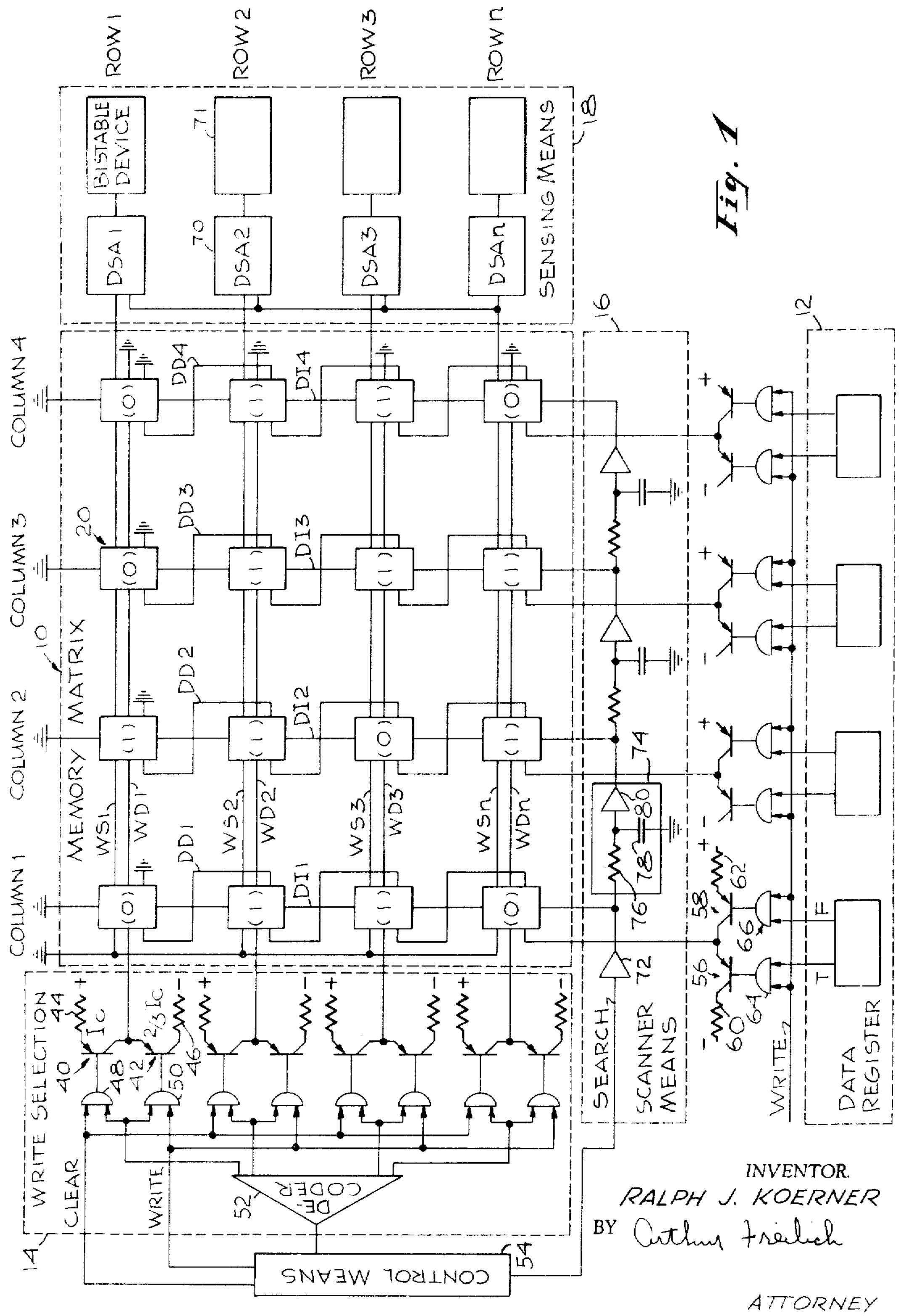
FIGURE 1 is a schematic block diagram of a first embodiment of a content addressable memory constructed in accordance with the present invention.

Attention is now called to FIGURE 1 which illustrates a content addressable memory constructed in accordance with the present invention and including a rectangular memory matrix 10 comprised of a plurality of memory elements, a data register 12 for storing information to be written into the memory matrix, write selection means 14 for selecting the location into which information is to be written, scanner means 16 for sequentially acting with respect to each of the search word bits, and sensing means 18 for sensing whether each stored bit matches or mismatches a corresponding search word bit.

The exemplary matrix 10 includes N horizontal rows of Q memory elements 20, wherein by way of example, N equals 4 and Q equals 4 so that each of the four rows is comprised of four memory elements which in turn define four vertical columns. Each of the memory elements 20 constitutes a bistable device thereby enabling it to assume first and second states respectively representative of binary digits or bits, namely "0" and "1." Each of the matrix rows can appropriately be referred to as a memory location, each location being capable of storing a bit pattern constituting a single word. Although the exemplary memory illustrated herein makes use of a four bit word length, it is pointed out that a memory of any arbitrary word length can be constructed in accordance with the invention.

Each of the Q matrix columns consists of a plurality of memory elements 20 each of which serves to store information of corresponding significance in a different row or memory location. That is, words may in fact represent numerical quantities and it is common practice to place bits of corresponding significance in such words in correspondingly positioned memory elements. For example, binary information can be stored in the elements of the memory matrix such that the elements in column 1 of the matrix respectively store the most significant bit of each stored word and the elements of columns 2 through 4 in the matrix respectively store bits of decreasing significance.

A digit interrogate line DI1 is associated with all of the memory elements 20 in column 1 of the matrix. Similarly, digit interrogate lines DI2, DI3, and DI4 are each correspondingly associated with all the memory elements of respectively different ones of the columns 2, 3, and 4 of the matrix. On the other hand, a word sense line WS1 is associated with all of the memory elements in row 1 of the matrix. Similarly, word sense lines WS2, WS3, and WS*n* are correspondingly associated with the memory elements of rows 2, 3, and *n* of the matrix. In addition, a word drive line WD1 is associated with all of the memory elements in row 1 of the matrix. Similarly, word drive lines WD2, WD3, WD*n* are correspondingly associated with the memory elements of matrix rows 2, 3, and *n*. Further, a digit drive line DD1 is associated with all of the memory elements of matrix column 1 and similarly, digit drive lines DD2, DD3, and DD4 are each correspondingly associated with all of the memory elements of respectively different ones of the matrix columns 2, 3, and 4.

Figure 2:
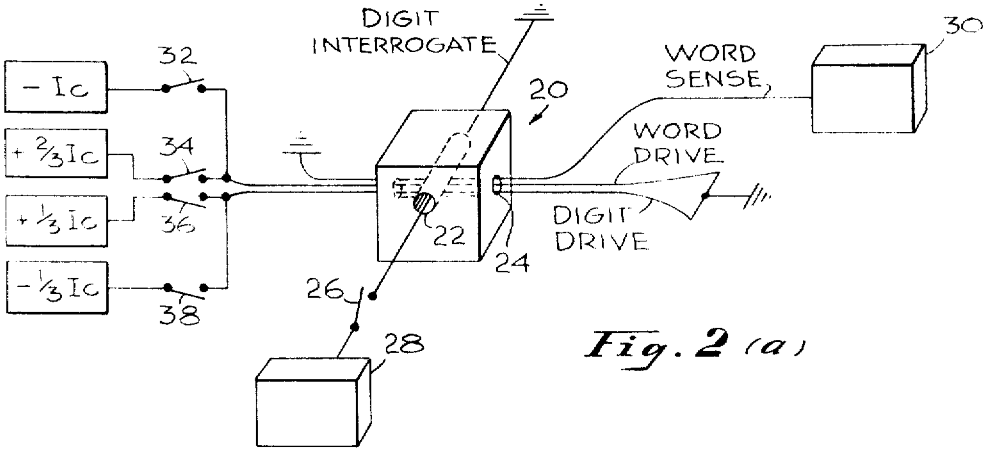
FIGURE 2(*a*) is a perspective view of a typical memory element which can be suitably employed in the embodiment of FIGURE 1.
Figure 2:
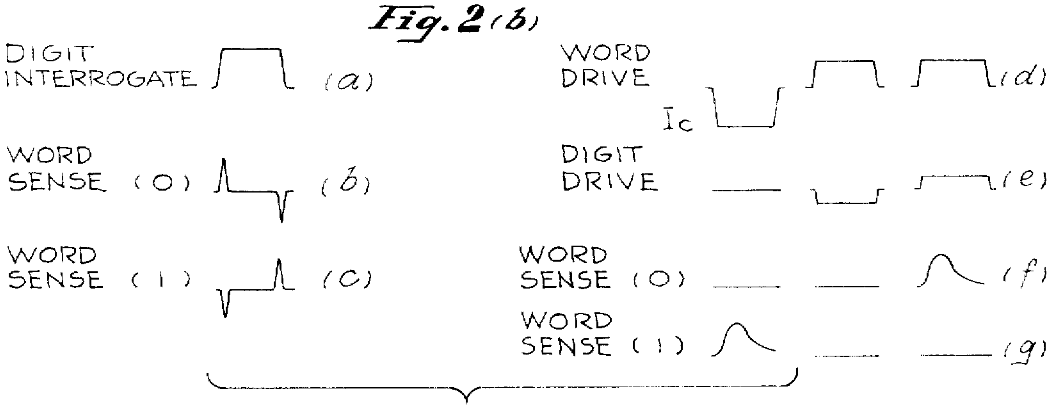

Attention is now momentarily called to FIGURE 2(*a*) showing a perspective view of a structural device constituting a non-destructive readout memory element which could be utilized in the memory matrix 10 of FIGURE 1, the operational characteristics of the memory element of FIGURE 2(*a*) being illustrated in FIGURE 2(*b*).

FIGURE 2(*a*) illustrates a magnetic memory element 20 commonly called a Biax. Such an element comprises a block of magnetic material having apertures 22 and 24 extending therethrough perpendicularly to one another. A digit interrogate line is threaded through the aperture 22 while a word sense line, a word drive line, and a digit drive line are all threaded through the aperture 24. The digit interrogate line is utilized as a conduction path for carrying current to interrogate the state of the element 20 and is connected between a source of reference potential, as ground, and a switch 26 which in turn is connected to a current source 28. The word sense line is utilized to sense the state of the element 20 and is connected between a source of reference potential, as ground, and a sensing device 30.

The word drive line is connected between a source of reference potential, as ground, and a pair of switches 32 and 34 which are respectively connected to current sources providing currents $-I_c$ and $+\frac{2}{3}I_c$. The switches 32 and 34 can be closed independently but cannot both be closed at the same time. The current $I_c$ represents a current magnitude sufficient to switch the direction of the flux in the magnetic element 20. Closure of the switch 32 therefore has the effect of providing a current having a magnitude $I_c$ on the word drive line in a negative direction and hence will be considered as causing a flux orientation in the element 20 representative of a "0" bit. Closure of the switch 34 will provide a current $\frac{2}{3}I_c$ in a positive direction on the word drive line which of course will be generally insufficient to change the direction of the flux in the element 20. The digit drive line is also connected between a reference potential, as ground, and a pair of switches 36 and 38. Switch 36 is connected to a source of current $+\frac{1}{3}I_c$ and switch 38 is connected to a source of current $-\frac{1}{3}I_c$. Switches 36 and 38 cannot be closed at the same time. In order to write information into the memory element 20, the information in the memory element is initially cleared to "0" by closing switch 32. Then, the new information is written in by closing switch 34 and switch 36 if a "1" is to be written and switch 38 if the new information bit is "0." Although ideally, the current $-\frac{1}{3}I_c$ would not be necessary, as a practical manner in the utilization of the Biax, it is necessary to assure that the current $+\frac{2}{3}I_c$ applied to the word drive line alone does not switch the memory element 20 to its "1" state.

FIGURE 2(*b*) is a waveform chart illustrating the signals appearing on the various memory element lines in the course of writing in and reading out. In order to determine the state of the element 20, the switch 26 in the digit interrogate line is closed to thereby initiate a positive current pulse on the digit line as illustrated in line (*a*) of FIGURE 2(*b*). If it is initially assumed that the memory element 20 stores a "0," as a result of the current in the digit interrogate line, a positive voltage pulse will be initially generated on the word sense line followed by the generation of a negative pulse. If on the other hand, the element 20 stores a "1," the current pulse in the digit interrogate line initially causes a negative voltage pulse to appear on the word sense line followed by the appearance of a positive pulse. It is pointed out that state interrogations are accomplished in a non-destructive manner. That is, although the current driven through the digit interrogate line will induce voltage pulses on the word sense line, the current will not change the state of the memory element 20. The state of the element of course can be determined by conventional sense amplifiers which sense whether the initial pulse appearing on the word sense line is positive or negative. If a positive pulse is initially generated followed by a negative pulse, the element 20 of course stores a "0" and on the other hand, if a negative voltage pulse is initially generated followed by a positive pulse, the element 20 stores a "1."

Note in line (*d*) of FIGURE 2(*b*) that when a current $-I_c$ is applied to the word drive line, as by closing switch 32, an output pulse will be provided on the word sense line if the memory element stores a "1" as a result of the flux in the element 20 switching direction. On the other hand, note that when a current $+\frac{2}{3}I_c$ is applied to the word drive line and a current $-\frac{1}{3}I_c$ is applied to the digit drive line, no noticeable response appears on the word sense line meaning that there is no significant amount of flux switching in the memory element 20 which takes place. However, when the current $+\frac{2}{3}I_c$ is applied to the word drive line simultaneously with the application of a current $+\frac{1}{3}I_c$ to the digit drive line, a pulse will appear on the word sense line if the memory element 20 stores a "0."

Although, for purposes of illustration, the utilization of a Biax memory element has been assumed herein, any memory element device or structure which can be effectively read non-destructively can be employed in the practice of the present invention as illustrated by the various content addressable memory embodiments discussed herein.

Returning to FIGURE 1, it is pointed out that each of the word drive lines is connected between ground and a pair of transistor switches 40 and 42 which correspond to switches 32 and 34 of FIGURE 2(*a*). Each of the word drive lines is connected to the collector of transistor switch 40, the emitter of transistor switch 40 being connected through a resistor 44 to a source of positive potential. The word drive line in addition is connected to the emitter of transistor switch 42 whose collector is connected through a resistor 46 to a source of negative potential. The bases of the transistors 40 and 42 are respectively connected to the outputs of AND gates 48 and 50 which, when enabled, provide a negative potential suitable to forward bias the transistor switches. The values of the resistors 44 and 46 are chosen such that when AND gate 48 is enabled, the transistor 40 will be forward biased so as to establish a current $I_c$ in the word drive line and when AND gate 50 is enabled, transistor 42 will be forward biased so as to establish a current $\frac{2}{3}I_c$ in an opposite direction in the word drive line.

A decoder circuit 52 is provided which has a plurality of output terminals, each of which corresponds to one of the rows of the memory matrix 10. Each output terminal is connected to the input of a different pair of AND gates 48 and 50. In addition, a control means 54 is provided which has a "clear" output terminal, a "write" output terminal, a "search" output terminal and a "decoder input" output terminal. The clear and write output terminals are respectively connected to the inputs of all AND gates 48 and 50. The decoder input output terminal provides the input to the decoder 52 which uniquely identifies one of its output terminals and correspondingly one of the matrix rows.

The digit drive lines are similarly connected between ground and a pair of transistor switches 56 and 58 which respectively correspond to the switches 36 and 38 of FIGURE 2 (*a*). Each of the digit drive lines is connected to the emitter of transistor 56 whose collector is connected through a resistor 60 to a source of negative potential, and to the collector of transistor 58 whose emitter is connected through a resistor 62 to a source of positive potential. And gates 64 and 66 are connected to the bases of transistors 56 and 58, and when enabled, provide a forward biasing negative potential thereto. The values of the resistors 60 and 62 are chosen to be equal such that when either of the AND gates 64 or 66 is enabled, a current having the magnitude $\frac{1}{3}I_c$ will either be conducted downwardly in the digit drive line through transistor 56 or upwardly in the digit drive line through transistor 58.

Information to be written into any of the locations in the memory matrix is initially entered into a data register 12 comprised of four flip-flop stages, each flip-flop having true and false output terminals. The true and false output terminals of each of the flip-flops are respectively connected to the inputs of associated AND gates 64 and 66. The write output terminal of the control means 54 is connected to the input of all of the AND gates 64 and 66.

In order for information to be written into the memory matrix 10, the control means 54 initially provides a true signal on its clear output line and in addition provides suitable signals to the decoder 52 identifying one of the matrix rows. As a consequence, each of the memory elements in the identified row is cleared to a "0" state. Subsequently, the control means provides a true signal on its write output terminal thereby causing a current $+\frac{2}{3}I_c$ to be provided on the word drive line identified by the decoder 52 and currents of either $+\frac{1}{3}I_c$ or $-\frac{1}{3}I_c$ to be developed on the digit drive lines in accordance with the contents of the data register 12. Thus, it can be seen that information can be selectively entered into the memory matrix 10.

As previously indicated, a content addressable memory can be operated so that it can be searched on the basis of the contents stored therein rather than on the basis of address information identifying locations therein. It has been pointed out that in the aforementioned U.S. Patent No. 3,031,650 and in the pending U.S. patent application Serial No. 269,009, a search word is stored in a search word register and simultaneously compared with all of the words in the content addressable memory. In lieu of providing a search word register in the present embodiments disclosed herein, it is contemplated that the search word will be stored in one of the memory matrix locations, for example in row $n$ of the memory matrix of FIGURE 1. It should be readily understood at this point how selected information can be entered into selected locations of the memory matrix.

In order to compare the search word with each of the other words stored in the memory matrix, the row $n$ word sense line is connected to one input of all of the differential sense amplifiers 70. A second input to each of the differential sense amplifiers 70 is connected to a different one of the other word sense lines. More particularly, the differential sense amplifier DSA1 associated with row 1 of the memory matrix has a pair of input terminals which are respectively connected to word sense line WS1 and word sense line WS*n*. Similarly, the differential sense amplifier DSA2 associated with row 2 of the memory matrix has a pair of input terminals respectively connected to word sense line WS2 and word sense line WS*n*. Each of the word sense lines in FIGURE 2 is connected at its left terminal to a reference potential (illustrated as ground) and is threaded through the memory elements associated therewith in like manner.

The scanner means 16 is provided to sequentially apply interrogation currents to the digit interrogate lines. The scanner means includes an amplifier 72 whose input is connected to the search output terminal of the control means 54. The output of the amplifier 72 is directly connected to the digit interrogate line DI1 and through a delay circuit 74 to the digit interrogate line DI2. The delay circuit 74 includes a serially connected resistor 76 and capacitor 78 together with a threshold amplifier 80 responsive to the voltage across the capacitor 78. A similar delay circuit 74 couples the digit interrogate line DI2 to the digit interrogate line DI3 and still another delay circuit couples the digit interrogate line DI3 to the digit interrogate line DI4.

In order to perform a search which compares the search word stored in row $n$ of the memory matrix with each other word stored in the memory, the control means 54 provides a true signal on its search output terminal. In response thereto the amplifier 72 provides a square wave pulse, as is illustrated in line (*a*) of FIGURE 2(*b*), on the digit interrogate line DI1. In response to this pulse, each of the elements in column 1 of the matrix will provide an output signal on its associated word sense line, as shown in either line (*b*) or (*c*) of FIGURE 2(*b*), depending upon its state. These signals provided on the word sense lines will be propagated to the differential sense amplifiers 70. Assuming the elements in column 1 to store the bits indicated in parentheses in the blocks representing the elements, the signal appearing on word sense line WS1 will be the same as that appearing on word sense line WS*n* while the signals appearing on word sense lines WS2 and WS3 will be different from the signal appearing on word sense line WS*n*. Each of the differential sense amplifiers of course is responsive to a difference between the signals applied to the input terminals thereof to provide an output signal which is coupled to a bistable device 71 uniquely connected thereto. Inasmuch as the same signals will be applied to both input terminals of the differential sense amplifier DSA1. It will not provide an output signal. On the other hand, the differential sense amplifiers DSA2 and DSA3 will provide output signals since there will be a difference between the signals applied to their respective input terminals. This difference of course should have a magnitude equal to substantially twice the magnitude of the output signal derived from one of the memory elements 20. The output of the differential sense amplifiers can be considered as a mismatch signal which functions to set the bistable device 71 associated therewith. Thus, the bistable device 71 in rows 2 and 3 will be set indicating that the words stored in rows 2 and 3 mismatch the search word stored in row $n$. The bistable device associated with row 1 of the matrix will remain reset indicating that the bit stored in column 1 of matrix row 1 matches the initial search word bit.

In addition to the pulse propagated on the digit interrogate line DI1, a portion of the output energy provided by the amplifier 72 will charge the capacitor 78 through the resistor 76. Consequently, the potential at the input of the threshold amplifier 80 will be of a ramp shape. At a certain level, the threshold of the amplifier 80 will be exceeded and the amplifier 80 will in turn provide an interrogation pulse on digit interrogate line DI2. Consequently, output signals indicative of the state of the memory elements in column 2 will be provided on the associated word sense lines. It is to be noted that again no difference will exist between the signals applied to the input terminal of the differential sense amplifier DSA1 and consequently the bistable device 71 connected thereto will remain reset. Although the differential sense amplifier DSA2 will not provide another output signal to the bistable device 71 connected thereto, the bistable devices of matrix rows 2 and 3 will remain set to indicate that the associated stored words mismatch the search word.

The delay circuit coupling the digit interrogate line DI2 to the digit interrogate line DI3 will subsequently apply an interrogate pulse to the digit interrogate line DI3 which, as should be apparent, will cause the differential sense amplifier DSA1 to provide the output signal to set the bistable device 71 connected thereto. Consequently, inasmuch as all of the bistable devices 71 are set, it is apparent that none of the words stored in the memory matrix match the search word stored in row $n$.

It is pointed out that the time delay introduced by the delay circuit 74 must be sufficient to enable the interrogate pulse propagated in the preceding digit interrogate line to be propagated to at least the closest memory element associated therewith such that an output signal can be applied to the corresponding word sense line prior to an output signal being applied to the word sense line by a succeeding memory element. That is, a sufficient time delay must be introduced by the delay circuit 74 connected between digit interrogate line DI1 and digit interrogate line DI2 such that the interrogate pulse in digit interrogate line DI1 causes the column 1 row *n* memory element to provide an output signal on word sense line WS*n* before the column 2 row *n* element provides an output signal thereon. If the delay introduced by the delay circuit 74 is insufficient, the differential sense amplifiers will be unable to distinguish between successive signals applied to the word sense lines. On the other hand, if the delay is excessive, search times will be unnecessarily long.

After a search has been completed, the bistable devices 71 can be examined by a selection device (not shown), as discussed in the above-cited patent application Serial No. 269,009 which can comprise a commutator type device for sequentially selecting the bistable devices 71 which remain in a reset state after the content addressable memory has completed a search. Any one of several differently designed devices could perform the functions required of such a selection device.

It is pointed out that although the description of the embodiment of FIGURE 1 has been directed toward the performance of an "equality" search only, other searches such as "greater than" and "less than" magnitude comparison searches can be conducted by the apparatus of FIGURE 1 in the manner disclosed in the cited patent application Serial No. 269,009. In order to perform magnitude comparison searches, it is merely necessary to provide a second set of bistable devices (not shown), each of which is coupled to a different one of the bistable devices 71 by means which cause each of the second set bistable devices to switch to a set state whenever the bistable device 71 coupled thereto switches to a set state, except when the coupling means is inhibited. The coupling means should be inhibited in situations where a mismatch signal provided by the differential sense amplifiers does not mean that the associated stored word does not match the search word within a stated criterion. That is, assume that a "greater than" search is being conducted and all stored words whose magnitude is greater than the search word are to be considered as matching. When considering the column 1 bits which includes a search word bit "0," coupling between the bistable devices 71 and the second set of bistable devices (not shown) should be inhibited because any mismatch signals developed by the differential sense amplifiers 70 under these conditions would mean in fact that the stored words associated with such mismatch signals are in fact greater in magnitude than the search word and therefore match the search word within the stated criteria. Consequently, the bistable devices (not shown) should not be set in this event since so doing would indicate that the associated stored words mismatch the search word. The appropriate bistable devices 71 would be set however in order to prevent subsequent mismatch signals provided by the differential sense amplifiers from setting the secone set of bistable devices.

Figure 3:
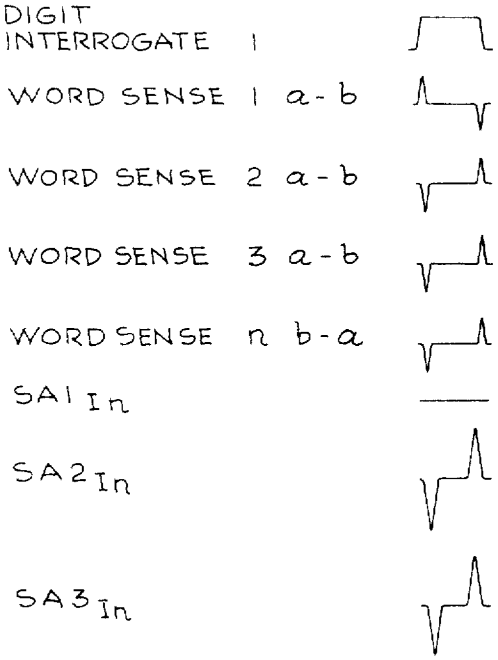
FIGURE 3(*a*) is a schematic block diagram of a second embodiment of a content addressable memory constructed in accordance with the present invention.
Figure 3A:
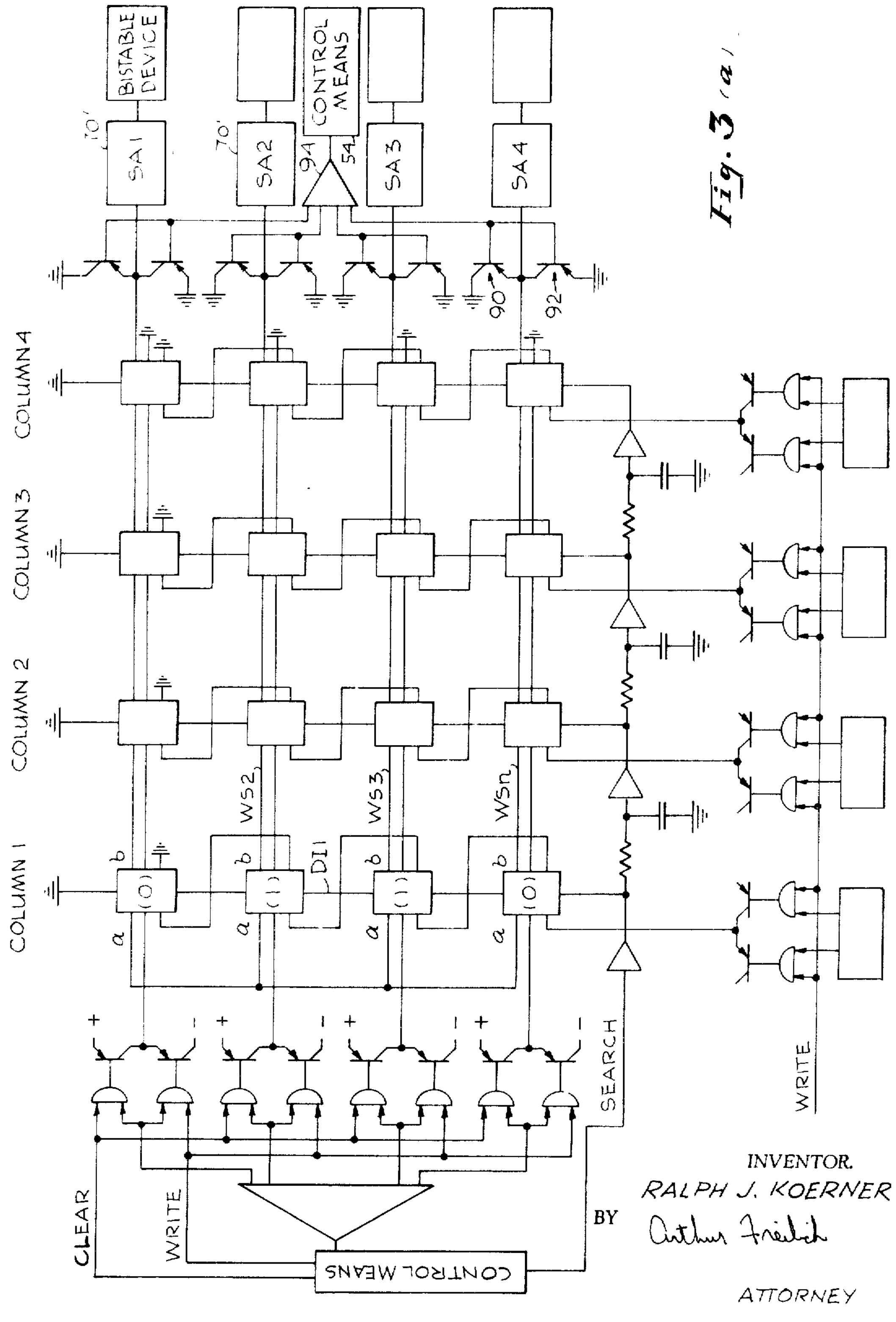

Attention is now called to FIGURE 3(*a*) which illustrates an alternative content addressable memory embodiment in accordance with the present invention. The embodiment of FIGURE 3(*a*) is substantially similar to that of FIGURE 1 except in lieu of employing differential sense amplifiers 70, conventional sense amplifiers 70' are provided and differences between the signals provided on the search word sense line and each of the other word sense lines are derived by connecting the search word sense line in opposition to each of the other word sense lines.

Consider initially that the righthand terminal of the word sense line WS*n* is connected to ground by forward biasing each of transistor switches 90 and 92 connected thereto. The word sense line WS*n* is connected to the emitter of transistor 90 whose collector is connected to ground and to the collector of transistor 92 whose emitter is connected to ground. The bases of the transistors 90 and 92 are connected to one of the output terminals of decoder 94 which is controlled by control means 54. The decoder 94 can provide a true enabling signal on only one of its output terminals at a time. Consequently, the righthand terminal of only word sense line WS*n* will be grounded while the right terminal of each of the other word sense lines will be connected directly to the input of a different sense amplifier 70'. The left terminals of all of the word sense lines are connected together.

Attention is now momentarily called to FIGURE 3(*b*) which illustrates the output signals provided on the various word sense lines in response to an interrogation current being provided on the digit interrogate line DI1. The point on each of the word sense lines to the left of the element is identified as point *a* and the point to the right of the element is identified as point *b*. Note that the voltage drop from point *a* to point *b* induced on the word sense line WS1 in response to an interrogate signal on the digit interrogate line DI1 will be as illustrated, representing a stored bit "0." The voltage drops appearing between points *a* and *b* of word sense lines WS2 and WS3 will also appear as illustrated, representing "1" bits. The voltage drop from point *a* to point *b* on word sense line WS*n* will of course be the same as the voltage drop between the corresponding points on word sense line WS1. Inasmuch as the righthand terminal of word sense line WS*n* is connected to the ground reference, the voltage drop from point *b* to point *a* of the word sense line WS*n* will be added to the voltage drops from points *a* to *b* of the other word sense lines and applied to the inputs of the sense amplifiers 70'. Consequently, no input will be provided to the sense amplifiers SA1 while inputs having substantially twice the magnitude of an output pulse developed by a single memory element, will be provided to the sense amplifiers SA2 and SA3 as indicated in FIGURE 3(*b*). As a result, the bistable devices 71 of rows 2 and 3 will be set so as to indicate that the words stored in matrix rows 2 and 3 mismatch the search word stored in row *n* thereof.

Thus, it should be apparent that the control means 54 can, through the decoder 94, connect any selected one of the word sense lines in opposition to all of the other word sense lines so as to effectively cause any one of the stored words to function as the search word. The provision of this capability is exceedingly useful inasmuch as it permits a rapid search of a large memory to ascertain whether any duplicates appear therein. Also, since any bits in the search words can be selectively masked by merely preventing an interrogation current from being applied to the corresponding digit interrogate line, any words in the memory which are nearly identical to each other can be easily located also.

Figure 4:
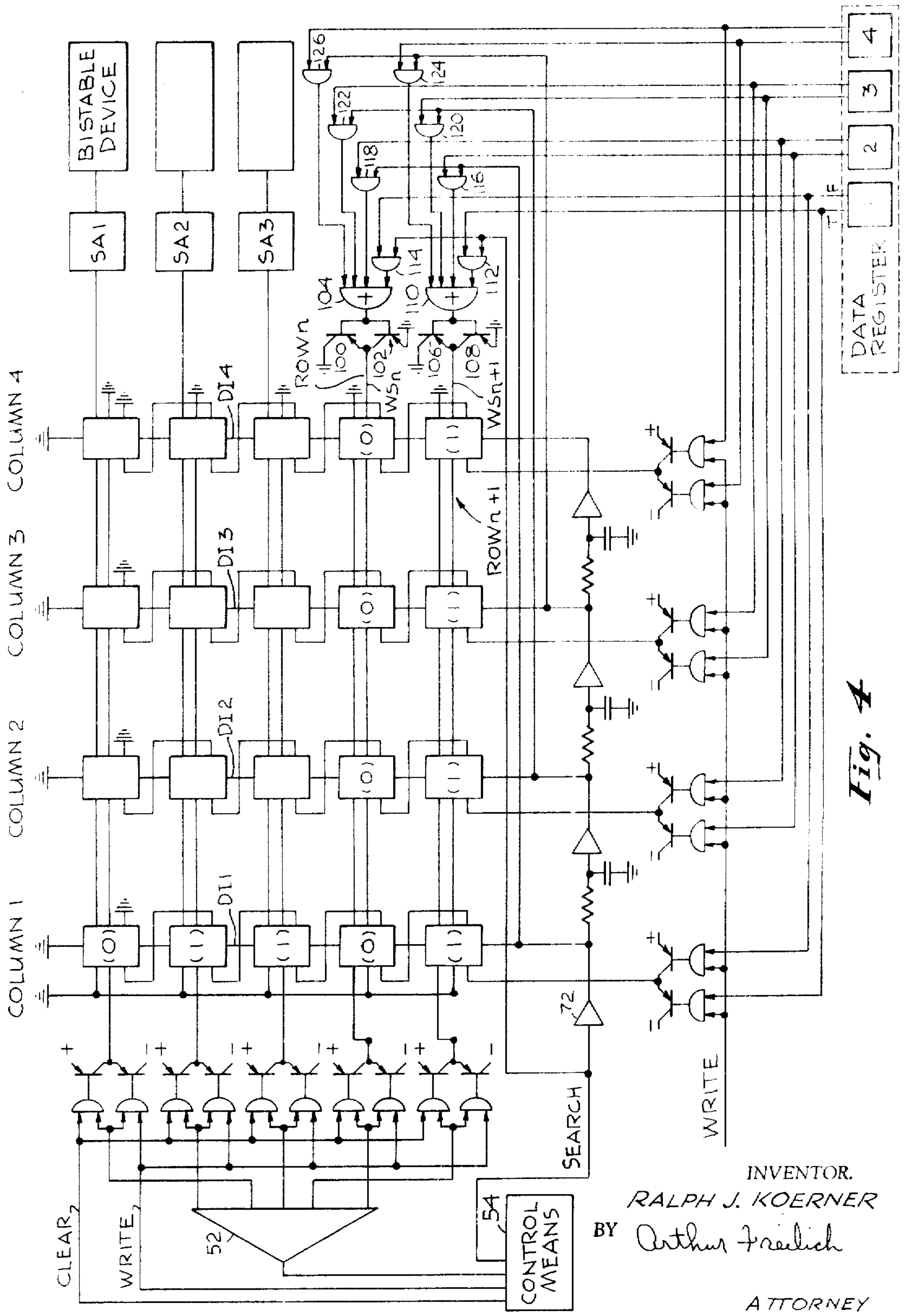
FIGURE 4 is a schematic block diagram of a third embodiment of a content addressable memory constructed in accordance with the present invention.

Attention is now called to FIGURE 4 which illustrates a third embodment of the present invention. FIGURE 4 is similar to the embodiments of FIGURES 1 and 3(*a*) but recognizes that in lieu of entering a search word into a memory location, a pair of words respectively consisting of all "0" bits and all "1" bits can be stored in a pair of memory locations and that the word sense lines associated with these locations can be sequentially connected in opposition to all of the other word sense lines in the memory in accordance with the bits of a search word stored in the data register. Note in FIGURE 4 that a word consisting of all "0" bits is stored in the row *n* location and that a word consisting of all "1" bits is stored in the row $n+1$ location. The word sense line WS*n* is connected to the emitter of a transistor 100 whose collector is connected to ground and to the collector of a transistor 102 whose emitter is connected to ground. The bases of transistors 100 and 102 are connected to the output of an OR gate 104. Similarly, the word sense line *WSn*+1 is connected to the emitter of transistor 106 whose collector is connected to ground and to the collector of transistor 108 whose emitter is connected to ground. The output of OR gate 110 is connected to the bases of transistors 106 and 108.

When the transistors 100 and 102 are forward biased, the word sense line WS*n* is connected in opposition to all of the other word sense lines in the memory so as to cause an output signal representative of a bit "0" to be applied in opposition to all of the other word sense lines. Similarly, when the transistors 106 and 108 are forward biased, an output signal representative of a bit "1" is applied in opposition to all of the word sense lines.

The inputs to OR gates 104 and 110 are derived from the outputs of the stages of the data register which is utilized to store the search word. Note that the true output terminal of stage 1 of the data register is connected to the input of AND gate 112 and the false output terminal thereof is connected to the input of AND gate 114. The second input to each of the AND gates 112 and 114 is connected to the search output terminal of the control means 54. A slight delay is incorporated in amplifier 72 and consequently, prior to an interrogation current being established in the digit interrogate line DI1, the AND gates 112 and 114 will set up the word sense lines so as to connect the appropriate word sense line, either WS*n* or *WSn*+1, in opposition to the other word sense lines. That is, assume that the initial bit in the data register is a "1," then AND gate 112 will be enabled to in turn cause OR gate 110 to forward bias transistors 106 and 108 to connect word sense line *WSn*+1 in opposition to the other word sense line. The establishment of the interrogation current in the digit interrogate line DI1 in turn sets up the word sense lines WS*n* and *WSN*+1 for the column 2 search bit. That is, the digit interrogate line DI1 is connected to the input of AND gates 116 and 118 along with the true and false outputs respectively of stage 2 of the data register. The outputs of AND gates 116 and 118 are respectively connected to the inputs of OR gates 110 and 104. Similarly, the digit interrogate line DI2 is connected to the input of AND gates 120 and 122 and the digit interrogate line DI3 is connected to the inputs of AND gates 124 and 126. The true and false output terminals of stage 3 of the data register are connected respectively to the inputs of AND gates 120 and 122 and the true and false output terminals of stage 4 of the data register are respectively connected to the inputs of AND gates 124 and 126. The outputs of AND gates 120 and 124 are connected to the inputs of OR gate 110 and the outputs of AND gates 122 and 126 are connected to the inputs of OR gate 104. The operation of the embodiment of FIGURE 4 is otherwise similar to that previously explained for FIGURES 1 and 3(*a*).

It is recognized that in some practical situations the voltage levels appearing on the word sense lines WS*n* and *WSn*+1 may be insufficient to forward bias the transistors 100, 102, 106, and 108. In these situations, an alternative circuit arrangement could be employed in which the right terminal of these sense lines would be grounded and an amplifier and gate would be inserted at the left ends, the gates being enabled by the output of gates 104 and 110.

From the foregoing, it should be apparent that several content addressable memory embodiments have been disclosed herein which make use of the matrix memory elements themselves to generate signals representative of the search word bit, which signals are utilized to effectively cancel output signals representing matching stored bits. Each of the embodiments of the invention comprises a somewhat different means for implementing this cancelling technique. The first embodiment teaches applying output signals representing both the stored bit and search bit to the input terminals of a differential sense amplifier which senses whether the stored and search bit match or mismatch. The second embodiment of the invention teaches connecting the word sense lines associated with the location storing the search word in opposition to all of the other word sense lines. The third embodiment of the invention teaches that the word sense lines respectively associated with a pair of memory locations respectively storing all "0" bits and all "1" bits can be connected in opposition to the other word sense lines in accordance with the bits of a search word stored in a data register.

A scanner means usable in each of the embodiments is disclosed which enables a sequential bit search to be performed in the minimum amount of time. Although detailed attention herein has been directed only to the performance of equality searches, it is again pointed out that through the utilization of techniques disclosed in the cited U.S. patent application Serial No. 269,009, other searches, such as magnitude comparison searches, can be performed.

It is further pointed out that although each of the invention embodiments has been described as being comprised of a matrix of memory elements disposed in orthogonally related rows and columns, it should be understood that the physical orientation of the elements relative to one another is generally of little importance. To this end, the terms "rows" and "columns" may be generally interchanged and may be considered to refer to respective groups of memory elements not necessarily physically arranged so as to geometrically define orthogonally related lines.

The embodiments of the invention in which an exclusive property or privilege is claimed are defined as follows:

1. A content addressable memory comprising:
a matrix of identical memory elements respectively including N rows of elements, each row comprising a memory location capable of storing a word, and Q columns of elements, each column including a correspondingly positioned memory element from each location, each of said elements capable of assuming at least two different states;
means for sequentially interrogating on a column by column basis all of the elements in each column to develop successive sets of indicating signals, each signal of a given set indicating the state of a different one of the interrogated memory elements; and
means for effectively combining a predetermined one of said signals in a given set with each other signal in said set.

2. A content addressable memory comprising:
a matrix of identical memory elements respectively including N rows of elements, each row comprising a memory location capable of storing a word, and Q columns of elements, each column including a correspondingly positioned memory element from each location, each of said elements capable of assuming at least two different states;
a plurality of digit interrogate lines each of which is associated with all of the elements of a different one of said matrix columns;
a plurality of word sense lines each of which is associated with all of the elements of a different one of said matrix rows;
scanner means energizable to sequentially apply signals to said digit interrogate lines;
each of said elements being responsive to a signal on the digit interrogate line associated therewith for providing an output signal on its associated word sense line indicative of its state; and
sensing means associated with each of said word sense lines for sensing whether an output signal appearing thereon is the same as or different from an output signal appearing on a predetermined other one of said word sense lines.

3. The content addressable memory of claim 2 wherein said scanner means includes a plurality of delay circuits;

each of said delay circuits including an energy storing means connected to one of said digit interrogate lines for storing a portion of the energy provided thereon and a threshold amplifier responsive to a predetermined stored energy level of said energy storing means for providing energy on a succeeding digit interrogate line.

4. The content addressable memory of claim 3 wherein said energy storing means comprises a capacitor connected in series with an impedance whereby said capacitor is charged in response to a current in said one of said digit interrogate lines;

said threshold amplifier being responsive to the voltage drop across said capacitor.

5. A content addressable memory comprising:

a matrix of identical memory elements respectively including N rows of elements, each row comprising a memory location capable of storing a word, and Q columns of elements, each column including a correspondingly positioned memory element from each location, each of said elements capable of assuming at least two different states;

a plurality of digit interrogate lines each of which is associated with all of the elements of a different one of said matrix columns;

a plurality of word sense lines each of which is associated with all of the elements of a different one of said matrix rows;

means for selectively storing a search word in a predetermined one of said memory locations;

means for selectively storing words in each of said other memory locations;

scanner means energizable to sequentially apply signals to said digit interrogate lines;

each of said elements being responsive to a signal on the digit interrogate line associated therewith for providing an output signal on its associated word sense line indicative of its state; and sensing means associated with each of said word sense lines for sensing whether an output signal appearing thereon is the same as or different from an output signal appearing on the word sense line associated with said predetermined location.

6. A content addressable memory comprising:

a matrix of identical memory elements respectively including N rows of elements, each row comprising a memory location capable of storing a word, and Q columns of elements, each column including a correspondingly positioned memory element from each location, each of said elements capable of assuming at least two different states;

a plurality of digit interrogate lines each of which is associated with all of the elements of a different one of said matrix columns;

a plurality of word sense lines each of which is associated with all of the elements of a different one of said matrix rows;

means for selectively storing a search word in a predetermined one of said memory locations;

means for selectively storing words in each of said other memory locations;

scanner means energizable to sequentially apply signals to said digit interrogate lines;

each of said elements being responsive to a signal on the digit interrogate line associated therewith for providing an output signal on its associated word sense line indicative of its state;

a plurality of differential sense amplifiers each of which has a first and a second input terminal;

means connecting the word sense line associated with said predetermined location to the first input terminal of all of said differential sense amplifiers; and means connecting each of said other word sense lines to the second input terminal of a different one of said differential sense amplifiers.

7. A content addressable memory comprising:

a matrix of identical memory elements respectively including N rows of elements, each row comprising a memory location capable of storing a word, and Q columns of elements, each column including a correspondingly positioned memory element from each location, each of said elements capable of assuming at least two different states;

a plurality of digit interrogate lines each of which is associated with all of the elements of a different one of said matrix columns;

a plurality of word sense lines each of which is associated with all of the elements of a different one of said matrix rows;

scanner means energizable to sequentially apply signals to said digit interrogate lines;

said scanner means including a delay circuit coupling each of said digit interrogate lines to a succeeding digit interrogate line.

8. The content addressable memory of claim 7 wherein each of said delay circuits includes an energy storing device and an energy threshold responsive device connected thereto;

means coupling said energy storing device to a first digit interrogate line and said energy threshold responsive device to a succeeding digit interrogate line.

9. A content addressable memory comprising:

a matrix of identical memory elements respectively including N rows of elements, each row comprising a memory location capable of storing a word, and Q columns of elements, each column including a correspondingly positioned memory element from each location, each of said elements capable of assuming at least two different states;

a plurality of digit interrogate lines each of which is associated with all of the elements of a different one of said matrix columns;

a plurality of word sense lines each of which is associated with all of the elements of a different one of said matrix rows;

means for selectively storing a search word in a predetermined one of said memory locations;

means for selectively storing words in each of said other memory locations;

scanner means energizable to sequentially apply signals to said digit interrogate lines;

each of said elements being responsive to a signal on the digit interrogate line associated therewith for providing an output signal on its associated word sense line indicative of its state;

sensing means associated with each of said word sense lines for sensing whether an output signal appearing thereon is the same as or different from an output signal appearing on the word sense line associated with said predetermined location;

said sensing means including means for developing on each of said word sense lines, the sum of a signal provided thereon by an element associated therewith and the signal appearing on said word line associated with said predetermined location; and sense amplifier means connected to each of said word sense lines.

10. A content addressable memory comprising:

a matrix of identical memory elements respectively including N rows of elements, each row comprising a memory location capable of storing a word, and Q columns of elements, each column including a correspondingly positioned memory element from each location, each of said elements capable of assuming at least two different states;

a plurality of digit interrogate lines each of which is associated with all of the elements of a different one of said matrix columns;

a plurality of word sense lines each of which is associated with all of the elements of a different one of said matrix rows;

means for selectively storing words in each of said memory locations;

scanner means energizable to sequentially apply signals to said digit interrogate lines;

each of said elements being responsive to a signal on the digit interrogate line associated therewith for providing an output signal on its associated word sense line indicative of its state;

means for selectively connecting one of said word sense lines in opposition to all other word sense lines; and sense amplifier means connected to each of said word sense lines.

11. A content addressable memory comprising:

a matrix of identical binary memory elements respectively including N rows of elements, each row comprising a memory location capable of storing a word, and Q columns of elements, each column including a correspondingly positioned memory element from each location;

a plurality of digit interrogate lines each of which is associated with all of the elements of a different one of said matrix columns;

a plurality of word sense lines each of which is associated with all of the elements of a different one of said matrix rows;

means for storing a word comprised of all "0" bits in a first of said locations;

means for storing a word comprised of all "1" bits in a second of said locations;

a data register including Q stages, each stage storing a different bit of a search word corresponding in significance to the bits stored in a different one of said matrix columns;

scanner means energizable to sequentially apply signals to said digit interrogate lines;

each of said elements being responsive to a signal on the digit interrogate line associated therewith for providing an output signal on its associated word sense line indicative of its state;

switch means for sequentially connecting said word sense lines respectively associated with said locations storing said words comprised of all "0" and all "1" bits in opposition to all other word sense lines in accordance with the bits of said search word stored in said data register; and sense amplifier means connected to each of said word sense lines.

12. The content addressable memory of claim 11 wherein said scanner means includes a plurality of delay circuits;

each of said delay circuits including an energy storing means connected to one of said digit interrogate lines for storing a portion of the energy provided thereon and a threshold amplifier responsive to a predetermined stored energy level of said enregy storing means for providing energy on a succeeding digit interrogate line and for coupling one of said data register stages to said switch means.

13. Apparatus for comparing the states of two binary memory elements, each of said elements having a common digit interrogate line associated therewith and being responsive to a signal appearing thereon for providing an output signal indicative of its state on a word sense line uniquely associated therewith, said apparatus including:

sensing means connected to said word sense lines for developing a signal proportional to the difference between the output signals respectively provided thereon.

14. Apparatus for comparing a first multibit word stored in a first group of binary memory elements with a second multibit word stored in a second group of binary memory elements comprising:

a plurality of digit interrogate lines each of which is associated with elements in said first and second groups storing bits of corresponding significance;

scanner means for sequentially applying a signal to each of said plurality of digit interrogate lines;

first and second word sense lines respectively coupled to the elements of said first and second groups;

each of said elements being responsive to a signal applied to the digit interrogate line associated therewith for providing an output signal indicative of its state on the word sense line associated therewith; and sensing means connected to said word sense lines for developing a signal proportional to the difference between the output signals respectively provided thereon.

15. The apparatus of claim 14 wherein said sensing means includes means for connecting said first and second word sense lines in opposition.

16. Apparatus for comparing a first multibit word stored in a multistage data register with a second multibit word stored in a first group of binary memory elements comprising:

means storing a word comprised of all "1" bits in a second group of binary memory elements;

means storing a word comprised of all "0" bits in a third group of binary memory elements;

a plurality of digit interrogate lines each of which is associated with elements in said first, second, and third groups storing bits of corresponding significance;

scanner means for sequentially applying a signal to each of said plurality of digit interrogate lines;

first, second, and third word sense lines respectively coupled to the elements of said first, second, and third groups;

each of said elements being responsive to a signal applied to the digit interrogate line associated therewith for providing an output signal indicative of its state on the word sense line associated therewith;

switch means for sequentially connecting either of said second and third word sense lines in opposition to said first word sense line in accordance with the state of successive bits stored in said data register; and means for sensing resultant signals on said first word sense line.

17. The apparatus of claim 16 wherein said scanner means includes a plurality of delay circuits;

each of said delay circuits including an energy storing means connected to one of said digit interrogate lines for storing a portion of the energy provided thereon and a threshold amplifier responsive to a predetermined stored energy level of said energy storing means for providing energy on a succeeding digit interrogate line and for coupling one of said data register stages to said switch means.

18. The apparatus of claim 16 wherein each of said memory elements comprises a magnetic core having first and second orthogonally oriented apertures;

said digit interrogate line being threaded through said first aperture and said word sense line being threaded through said second aperture.

19. A matrix of identical memory elements respectively including N rows of elements, each row comprising a memory location capable of storing a word, and Q columns of elements, each column including a correspondingly positioned memory element from each location, each of said elements capable of assuming at least two different states;

means for interrogating all of the elements in each column to develop sets of indicating signals, each signal of a given set indicating the state of a different one of the interrogated memory elements; and means for effectively combining a predetermined one of said signals in each of said sets with each other signal in that set.

20. Apparatus for comparing a first multibit word stored in a first group of binary memory elements with a second multibit word stored in a second group of binary memory elements comprising:

first and second word sense lines respectively coupled to the elements of said first and second groups;

scanner means for sequentially interrogating different pairs of corresponding elements in said first and second groups for providing an output signal indicative of the state of each element on the word sense line associated therewith; and sensing means connected to said word sense lines for developing a signal proportional to the difference between the output signals respectively provided thereon.

21. A content addressable memory comprising:

a matrix of identical memory elements respectively including N rows of elements, each row comprising a memory location capable of storing a word, and Q columns of elements, each column including a correspondingly positioned memory element from each location, each of said elements capable of assuming at least two different states;

means for sequentially interrogating on a column by column basis all of the elements in each column to develop successive sets of indicating signals, each signal of a given set indicating the state of a different one of the interrogated memory elements;

means for sequentially generating a plurality of binary signals, each substantially in time coincidence with a different set of indicating signals; and means associated with each of said rows responsive to the difference between indicating signals developed in response to the interrogation of memory elements thereof and the binary signal generated substantially in time coincidence therewith.

References Cited by the Examiner

UNITED STATES PATENTS 3,031,650 4/1962 Koerner ------------ 340—174

FOREIGN PATENTS 634,051 1/1962 Canada.

OTHER REFERENCES

Lussier & Schneider: All-Magnetic Content Addressed Memory, Electronic Industries, March 1963, pp. 92–98.

Kiseda et al.: A Magnetic Associative Memory, IBM Journal, April 1961, pp. 108–109.

ROBERT C. BAILEY, *Primary Examiner.*

P. L. BERGER, *Assistant Examiner.*